J. McGEE.

WHEEL CULTIVATOR.

No. 10,828. Reissued Apr. 19, 1887.

Witnesses:
H. M. Richards,
E. Williams.

Inventor:
James McGee,
By W. B. Richards,
Atty.

N. PETERS, Photo-Lithographer, Washington, D. C.

UNITED STATES PATENT OFFICE.

JAMES McGEE, OF SCOTT COUNTY, IOWA.

WHEEL-CULTIVATOR.

SPECIFICATION forming part of Reissued Letters Patent No. 10,828, dated April 19, 1887.

Original No. 348,760, dated September 7, 1886. Application for reissue filed February 14, 1887. Serial No. 227,620.

*To all whom it may concern:*

Be it known that I, JAMES McGEE, a citizen of the United States, residing in the county of Scott and State of Iowa, have invented certain Improvements in Wheeled Cultivators Intended to be Propelled by Hand, of which the following is a specification.

The main object of my invention is to hold the plow beams or gangs in their normal positions by yielding springs, which, while resisting, will permit swinging either or both beams laterally toward or from each other; and a further object is to utilize the springs as braces between the beams and axle, thus rendering the manipulation of the implement easier and diminishing the tendency of either wheel to get in advance of the other.

The invention is shown in connection with an ordinary two-wheeled cultivator having an arched axle and two laterally-moving drag-bars terminating in handles for propelling the implement and moving the bars laterally.

I attain these objects by the mechanism illustrated in the accompanying drawings, of which—

Figure 1:
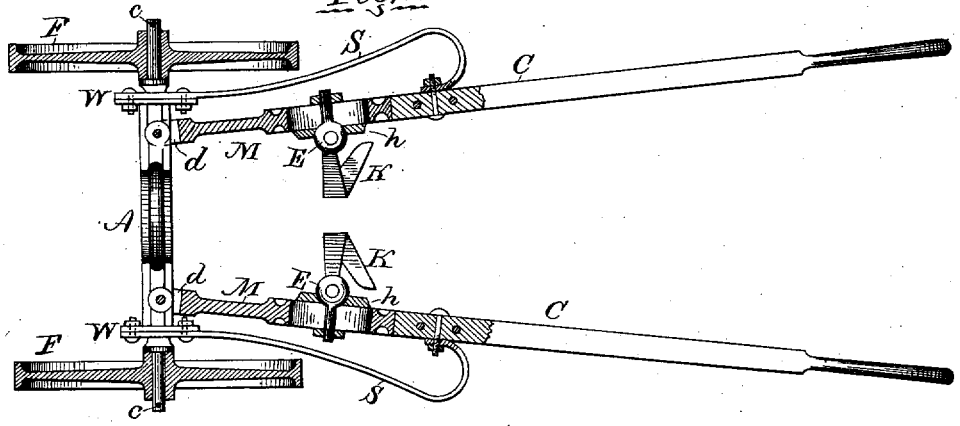
Figure 2:
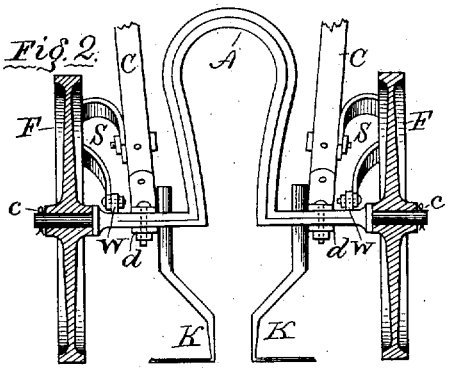
Figure 4:
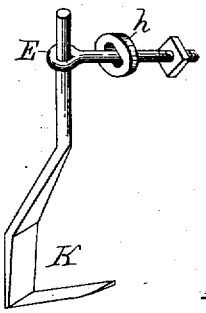
Figure 5:
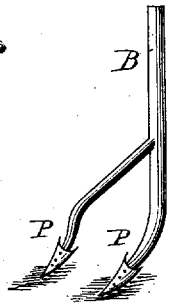
Figure 3:
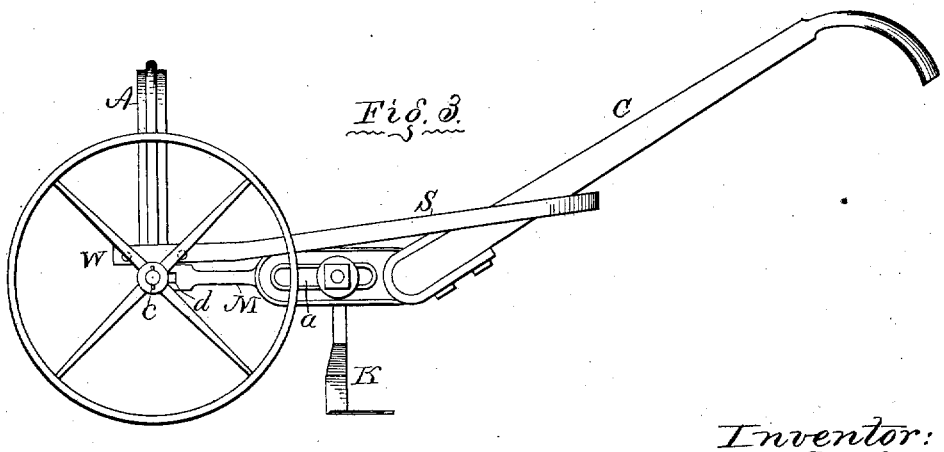

Figure 1 is a top plan, the wheels, beams, part of the handles, and part of the springs and nuts in sectional plan; Fig. 2, a front elevation, the wheels in sectional elevation and the plow-handles broken away. Fig. 3 is a side view of the cultivator. Fig. 4 is a perspective view of the knife and standard and eyebolt for securing the same upon the beam through the slot therein; and Fig. 5 is a perspective view of the shovels and standards.

Similar letters refer to similar parts throughout the several views.

The ends of the arched axle-tree A are inserted in the hubs of the wheels F F and secured by the shoulders thereon and the pins *c c*, or in any other well-known manner. The beams M M have at their rear ends the handles C C, bolted or secured thereto, and the front ends of said beams M M are bolted to the axle A, between the arch and wheel F, in any of the well-known ways, so that the beams M M may be moved laterally. Standards are secured to the beams M M by the device shown in Figs. 4 and 3, the eyebolt passing through slot *a* and secured by nut and thread, or by any well-known method, so that the shovels P P or knife K may enter the ground. This combination constitutes a well-known hand-cultivator. To this I add the features of my invention, which are the curved springs S S, or their equivalents, attached as follows: The front end of each spring S is preferably secured by a clip-bolt, W, or other convenient means, to the axle A between the wheel F and beam M, its rear end being bolted to the handle C. The force of each spring acts laterally, and hence, when the plow-beams are in such positions that the springs are in their normal conditions, if either plow-beam is swung outwardly its attached spring will tend to resist such movement; and when the springs are in their normal conditions, if either plow-beam is swung inwardly its attached spring will tend to resist such movement, and thus the laterally-acting springs will aid in manipulating the implement, not only by aiding in keeping the shovels from running too close to the plants, but also in assisting in bringing them back into their normal positions when deflected by any means. The spring S also acts as a brace between the handle C and axle A, preventing one wheel from running in advance of the other, steadying the implement, and rendering it easy of manipulation.

The cultivator is propelled by the operator pushing the same by the handles C C, and the shovels P P or knife K guided nearer to the plants by the operator forcing the handles C C inwardly; and upon the operator desisting from exerting such force the spring S thereupon forces the beam M outward until the springs are again brought into their normal positions, as shown at Fig. 1. The springs hold the axle and wheels so that one plow may be swung laterally while the other is held still, and holds the axle and wheels; and by swinging both beams laterally in the same direction the axle will swing around, or the cultivator may be turned around. Neither end of the axle can be advanced by pushing its affixed plow forward. In fact the springs hold the axle and plow-beams so that the axle and wheels can be effectually guided by swinging the plow-beams laterally, while at the same time not with such force as to prevent the operations hereinbefore described,

What I claim, and desire to secure by Letters Patent, is—

1. In combination, in a two-wheeled cultivator having an arched axle, wheels, and two laterally-swinging plow-beams with shovels or knives and handles, laterally-acting springs, each attached at one end to the axle and at the opposite end to the handle or plow-beam, to offer a yielding resistance to the lateral movements of the plow-beams, substantially as described, and for the purposes specified.

2. In combination, in a two-wheeled cultivator having an arched axle, wheels, and two laterally-swinging plow-beams with shovels or knives, and handles, springs, each attached at one end to the axle and at its opposite end to the handle or plow-beam, to offer a yielding resistance to the lateral movements of the plow-beam in either direction, substantially as and for the purpose described.

3. In combination with a two-wheeled hand-cultivator having an arched axle, two rear laterally-moving beams with shovels or knives, and handles for propelling or guiding connected therewith, the curved springs S S, each attached at one end to the axle between the wheel and beam and at the opposite end to the handle, so as to exert a force to move the beam outwardly toward the wheel and act as a brace between the axle and rear laterally-moving beam, substantially as described.

JAMES McGEE.

Witnesses:

PATRICK M. BRAULIN,

ANDREW H. McGEE.